United States Patent
Kwon et al.

(10) Patent No.: US 8,956,774 B2
(45) Date of Patent: Feb. 17, 2015

(54) METHOD FOR SHUTTING DOWN FUEL CELL SYSTEM

(75) Inventors: Sang Uk Kwon, Gyeonggi-Do (KR); Nam Woo Lee, Gyeonggi-Do (KR); Jae Jun Ko, Gyeonggi-Do (KR); Woo Suk Sung, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 672 days.

(21) Appl. No.: 12/625,669

(22) Filed: Nov. 25, 2009

(65) Prior Publication Data

US 2011/0065012 A1  Mar. 17, 2011

(30) Foreign Application Priority Data

Sep. 11, 2009  (KR) .................... 10-2009-0086124

(51) Int. Cl.
*H01M 8/04* (2006.01)
*H01M 16/00* (2006.01)

(52) U.S. Cl.
CPC ........ *H01M 16/006* (2013.01); *H01M 8/04253* (2013.01); *Y02E 60/50* (2013.01)
USPC ........................................ 429/429; 429/413

(58) Field of Classification Search
USPC ............................................. 429/429, 413, 13
See application file for complete search history.

(56) References Cited

U.S. PATENT DOCUMENTS

| | | | |
|---|---|---|---|
| 6,186,254 B1 * | 2/2001 | Mufford et al. | 429/442 |
| 6,608,463 B1 * | 8/2003 | Kelly et al. | 320/101 |
| 7,270,903 B2 * | 9/2007 | Osborne et al. | 429/413 |
| 7,368,193 B2 | 5/2008 | Osborne et al. | |
| 2007/0026277 A1 * | 2/2007 | Ogawa et al. | 429/22 |
| 2008/0113240 A1 | 5/2008 | Fagley et al. | |
| 2008/0241608 A1 * | 10/2008 | Zhang et al. | 429/13 |
| 2008/0292928 A1 * | 11/2008 | Cherchi et al. | 429/23 |

FOREIGN PATENT DOCUMENTS

| | | | | |
|---|---|---|---|---|
| JP | 2006-012472 | * | 1/2006 | ............. H01M 8/04 |
| JP | 2007-141812 A | | 6/2007 | |
| JP | 2007-157531 A | | 6/2007 | |
| JP | 2008-097993 A | | 4/2008 | |

\* cited by examiner

*Primary Examiner* — Ula C. Ruddock
*Assistant Examiner* — Osei Amponsah
(74) *Attorney, Agent, or Firm* — Mintz Levin Cohn Ferris Glovsky and Popeo, P.C.; Peter F. Corless

(57) ABSTRACT

A method for shutting down a fuel cell system includes: determining whether an outside air temperature is below a first predetermined reference temperature when a shutdown of a fuel cell system is detected; warming up the fuel cell stack by operating balance of plant components of the fuel cell system and a stack load using the power of the fuel cell stack, while the supply of hydrogen to the fuel cell stack is normally maintained, when the outside air temperature is below the first reference temperature; removing water in the fuel cell stack by passing air supplied by an air supply system through the stack load to supply heated air to a cathode of the fuel cell stack; and shutting down the fuel cell system by cutting off the supply of air after the removal of water. The method can eliminate or reduce cold start failure.

4 Claims, 8 Drawing Sheets

METHOD FOR SHUTTING DOWN FUEL CELL SYSTEM

CROSS-REFERENCE TO RELATED APPLICATION

This application claims under 35 U.S.C. §119(a) the benefit of Korean Patent Application No. 10-2009-0086124 filed Sep. 11, 2009, the entire contents of which are incorporated herein by reference.

BACKGROUND (a) Technical Field

The present disclosure relates to a method for shutting down a fuel cell system of a vehicle, which can effectively remove water from the fuel cell system when it is shut down at predetermined temperature or lower.

(b) Background Art

A fuel cell system applied to a hydrogen fuel cell vehicle as an environmental friendly vehicle comprises a fuel cell stack for generating electricity by an electrochemical reaction of reactant gases, a hydrogen supply system for supplying hydrogen as a fuel to the fuel cell stack, an oxygen (air) supply system for supplying oxygen-containing air as an oxidant required for the electrochemical reaction in the fuel cell stack, a thermal management system (TMS) for removing reaction heat from the fuel cell stack to the outside of the fuel cell system, controlling operation temperature of the fuel cell stack, and performing water management function, and a system controller for controlling the overall operation of the fuel cell system.

FIG. 1 is a schematic diagram of a typical fuel cell system.

As shown in FIG. 1, the fuel cell system includes a hydrogen supply system 110 and an air supply system 120. The hydrogen supply system 110 includes a hydrogen tank 111, a hydrogen supply valve 112, high-pressure and low-pressure regulators 113 and 114, and a hydrogen recirculation system 116. The air supply system 120 includes an air blower 122 and a humidifier 123.

In the hydrogen supply system 110, the high-pressure hydrogen of the hydrogen tank 111 sequentially passes through the high-pressure and low-pressure regulators 113 and 114 such that the hydrogen pressure is regulated, and the pressure-regulated hydrogen is supplied to an anode ("fuel electrode" or "hydrogen electrode") of a fuel cell stack 200. In the hydrogen recirculation system 116, an ejector 115 and a hydrogen recirculation blower 117 are provided at an outlet of the anode of the fuel cell stack 200 to recirculate unreacted hydrogen of the anode remaining after the reaction to the anode, thus recycling the hydrogen.

In the air supply system 120, the dry air supplied by the air blower 122 passes through the humidifier 123 to be humidified by absorbing water from the exhaust gas discharged from a cathode ("air electrode" or "oxygen electrode") of the fuel cell stack 200 and is then supplied to the cathode of the fuel cell stack 200.

A hydrogen purge valve 131 is provided at an anode outlet of the fuel cell stack 200 to discharge foreign substances such as nitrogen and water accumulated in the anode, and the water produced in the fuel cell stack is collected in a water trap 132 and then discharged.

The fuel cell system having the above-described configuration generates electricity by the electrochemical reaction between hydrogen as a fuel and air as an oxidant and discharges heat and water as by-products.

Meanwhile, one of the most difficult problems of the fuel cell vehicle is to improve cold startability. When the fuel cell system is exposed to a temperature below the freezing point of water and kept for a long time (cold soaking), the water present in the fuel cell stack and various components of the fuel cell system such as valves freezes, thus making it difficult to start the vehicle.

Especially, when the freezing occurs in the fuel cell stack, the respective flow fields and gas diffusion layers are clogged, and thus the reactant gases are not smoothly supplied to the fuel cell stack. Therefore, a normal electrochemical reaction does not take place, and the voltage of the fuel cell stack is not kept constant, which makes it difficult to ensure cold startability.

In order to improve the cold startability of the fuel cell system, a variety of techniques such as a method of rapidly thawing the frozen water in the fuel cell stack by heating coolant circulating through the fuel cell stack have been proposed. However, it is necessary to manage the status of the fuel cell system during shutdown together with the rapid thawing of the frozen water in the fuel cell stack.

For example, the water present in the fuel cell stack may be removed in advance when the fuel cell system is shut down at a temperature below the freezing point. In the case where the fuel cell system is shut down under the condition that the ambient temperature is below the freezing point, it is necessary to remove the water produced in the fuel cell stack to ensure stability during the next start-up. If the fuel cell system is shut down while the product water is not removed from the fuel cell stack, the surface of the inside of the fuel cell stack freezes, thus making it difficult to start the vehicle.

To solve the above-described problems, there have been proposed a variety of methods of improving the cold startability by removing the water present in the fuel cell stack such as the inside of a membrane electrode assembly by flowing the fuel (hydrogen) or oxidant (air) through the fuel cell stack when a shutdown is detected at a temperature below the freezing point.

For example, U.S. Pat. No. 6,479,177 discloses a method of removing water remaining in a fuel cell stack by flowing dry gas through the fuel cell stack during shutdown when the temperature is below the freezing point. U.S. Pat. No. 6,887,598 discloses a method of removing water from a fuel cell stack by discontinuing reactant humidification before shutdown of the fuel cell stack and increasing the amount of air supplied. U.S. Pat. No. 7,270,903 discloses a method of removing water from a fuel cell stack by measuring the temperature in the vicinity of a fuel cell vehicle via a thermostat when the fuel cell stack has been shut down for a long time and, when the temperature is below zero, flowing air through the fuel cell stack. U.S. Pat. No. 7,344,795 discloses a method of removing water from a fuel cell stack by supplying air bypassed through a humidifier and an intercooler to the fuel cell stack during shutdown. Besides, there has been provided a method in which the exhaust gas of the fuel cell stack 200 supplied to the humidifier 123 is cut off to stop the humidification of the humidifier 123, the dry air passed through the humidifier 123 by the air blower 122 is supplied to the cathode of the fuel cell stack 200 to remove water from the cathode, and then the fuel cell system is shut down.

However, the above-described methods have the problem that the water remaining in the fuel cell stack is not completely removed, and thus it is impossible to ensure stable startability during the next cold start. Especially, it is difficult to completely remove water from the fuel cell stack only by flowing dry air through the fuel cell stack, and further it is not easy to remove water from the electrolyte membrane as well as from the flow fields such as the cathode channel.

Although it is suitable to supply heated gas to the fuel cell stack, the amount of heated gas is small if there is no heater. Moreover, although the heat generated from the air compressor may be used instead of using the heater, the amount of heat generated is too small to be used in an atmospheric pressure system which employs a blower.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a method for shutting down a fuel cell system, the method including: determining whether an outside air temperature is below a first predetermined reference temperature when a shutdown of a fuel cell system is detected; warming up the fuel cell stack by operating balance of plant components of the fuel cell system and a stack load using the power of the fuel cell stack, while the supply of hydrogen to the fuel cell stack is normally maintained, when the outside air temperature is below the first reference temperature; removing water in the fuel cell stack by passing air supplied by an air supply system through the stack load to supply heated air to a cathode of the fuel cell stack; and shutting down the fuel cell system by cutting off the supply of air after the removal of water.

In a preferred embodiment, the method for shutting down the fuel cell system may further includes: determining whether the temperature of the fuel cell stack rises up to a second predetermined reference temperature while the heated air is supplied to the cathode; operating the balance of plant components and the stack load only by the power of an electricity storage means as an auxiliary power source for a predetermined period of time, when the temperature of the fuel cell stack exceeds the second reference temperature, to supply the air supplied by the air supply system and heated by the stack load to the cathode of the fuel cell stack, thus removing water from the fuel cell stack; and shutting down the fuel cell system by cutting off the supply of air.

The above and other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
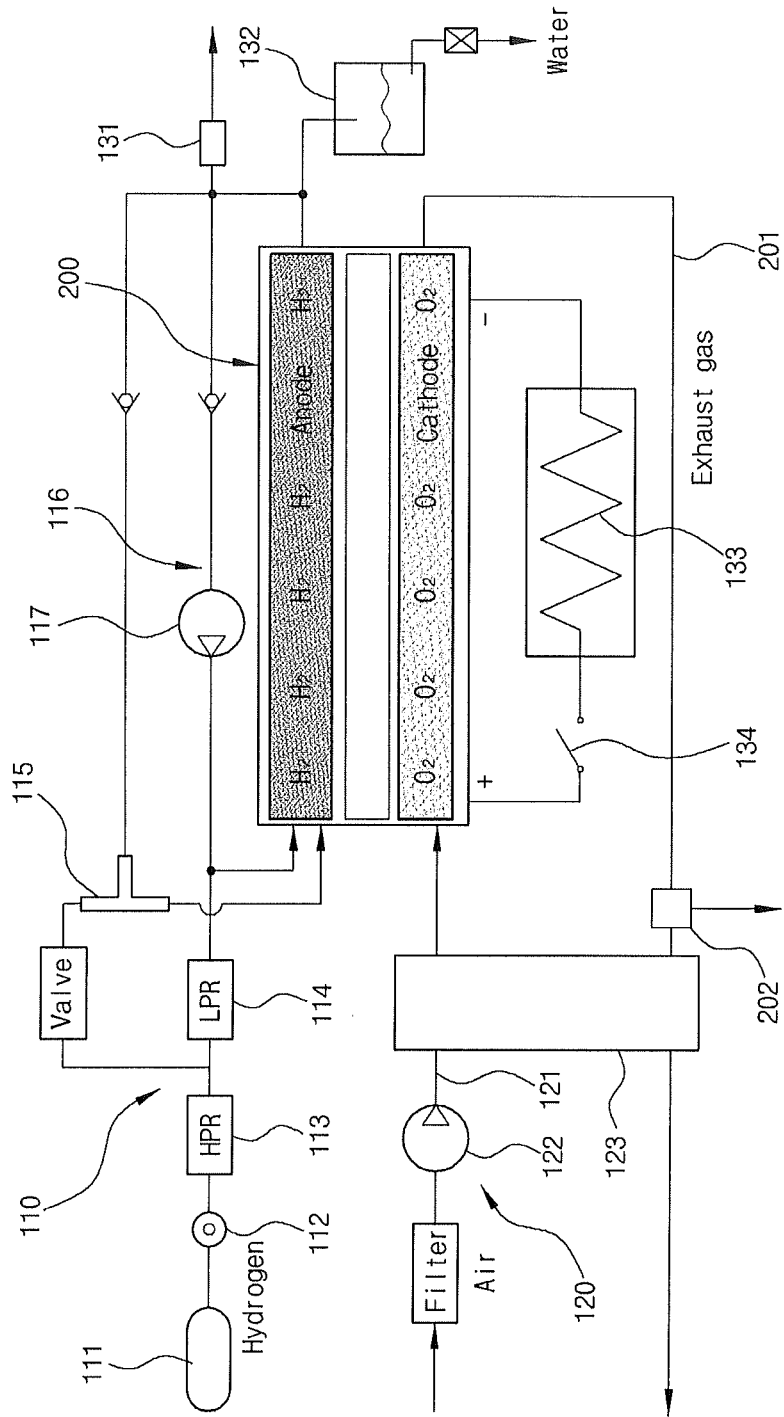
FIG. 1 is a configuration diagram of a typical fuel cell system.

Reference numerals set forth in the Drawings includes reference to the following elements as further discussed below:

| 100: BOP components | 110: hydrogen supply system |
|---|---|
| 117: hydrogen recirculation blower | 120: air supply system |
| 122: air blower | 123: humidifier |
| 133: stack load (stack-coupled resistor) | |
| 134: relay | 135: bypass line |
| 136: valve means (three-way valve) | 200: fuel cell stack |
| 300: battery | 310: DC/DC converter |
| 401: main relay | 410: inverter |
| 420: drive motor | 500: controller |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
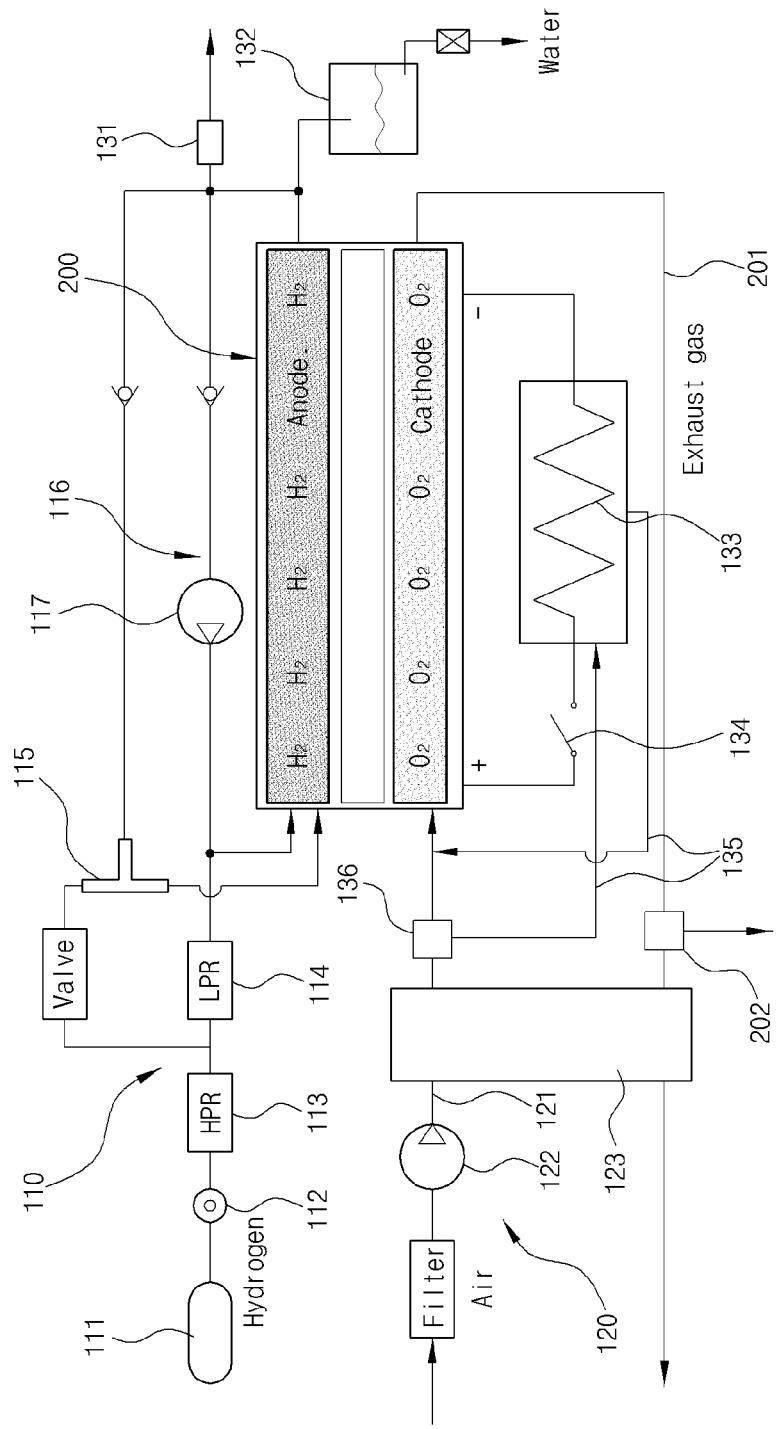
FIG. 2 is a configuration diagram of a fuel cell system in accordance with a preferred embodiment of the present invention.

FIG. 2 is a configuration diagram of a fuel cell system in accordance with a preferred embodiment of the present invention.

As shown in FIG. 2, the fuel cell system includes a fuel cell stack 200, a hydrogen supply system 110 and an air supply system 120, which supply reactant gases to the fuel cell stack 200, a hydrogen purge valve 131 for purging an anode ("fuel electrode" or "hydrogen electrode") of the fuel cell stack 200 with hydrogen, and a water trap 132 for collecting water in the fuel cell stack 200 and discharging the water therefrom (an anode water trap is shown).

The hydrogen supply system 110 includes a hydrogen tank 111, a hydrogen supply valve 112, high-pressure and low-pressure regulators 113 and 114, an ejector 115, and a hydrogen recirculation system 116, and the air supply system 120 includes an air blower 122 and a humidifier 123.

In the same manner as a typical fuel cell system, the high-pressure hydrogen of the hydrogen tank 111 sequentially passes through the high-pressure and low-pressure regulators 113 and 114 such that the hydrogen pressure is regulated, and the pressure-regulated hydrogen is supplied to the anode of the fuel cell stack 200, and unreacted hydrogen of the anode remaining after reaction is recirculated to the anode by a hydrogen recirculation blower 117 provided at an outlet of the anode ("anode outlet").

Moreover, the dry air supplied by the air blower 122 passes through the humidifier 123 to be humidified by absorbing water from the exhaust gas discharged from a cathode ("air electrode" or "oxygen electrode") of the fuel cell stack 200 and is then supplied to the cathode of the fuel cell stack 200.

The hydrogen purge valve 131 is provided at the anode outlet of the fuel cell stack 200 to discharge foreign substances such as nitrogen and water accumulated in the anode, and the water produced in the fuel cell stack 200 is collected in a water trap 132 and then discharged.

According to the present invention, the interior of the fuel cell stack 200 is purged with dry gas for removal of water. In addition, heating and supplying dry gas are applied for more efficient removal of water.

Here, an existing air supply device 120 may be used to remove water by supplying dry gas to the cathode of the fuel cell stack 200 without adding any hardware and, in this case, the dry air which is supplied from the outside (external air) by the air blower 122 is used as the dry gas.

In a typical fuel cell system, the air supplied to the fuel cell stack 200 as a reactant gas should pass through the humidifier 123 for the humidification. Therefore, in order to purge the interior of the fuel cell stack 200 by supplying dry air using the existing air supply system 120, it is necessary to bypass the dry air so as not to pass through the humidifier 123 or cut off the water source of the humidifier 123 through which the air passes.

In the case of a gas-to-gas membrane humidifier using hollow fiber membranes, since the humidifier 123 uses the wet exhaust gas discharged from the cathode of the fuel cell stack 200 as the water source, the exhaust gas of the fuel cell stack 200 may be bypassed by a bypass valve 202 or discharged to the outside so as not to pass through the humidifier 123 in an exhaust line 201, thus cutting off the water source.

Of course, it is possible to bypass the dry air supplied by the air blower 122 through a separate bypass line, which does not pass through the humidifier 123, and supply the bypassed air to the cathode of the fuel cell stack 200.

Moreover, in the present invention, a stack load 133 is used to exhaust the oxygen in the cathode and eliminate the voltage of the fuel cell stack 200 during shutdown of the fuel cell system as the configuration for heating the dry gas for removal of water.

The stack load 133 applies a load to the fuel cell stack 200 during a typical shutdown process to exhaust the oxygen remaining in the cathode and eliminate the voltage of the fuel cell stack 200. As the stack load 133, a resistor (stack-coupled resistor), which is a passive load that consumes the current supplied from the fuel cell stack 200 by generating heat while a relay 134 is turned on by a typical controller.

Therefore, when the existing stack load 133 provided in the fuel cell system is used, it is not necessary to additionally provide a heating means for heating air, and it is possible to provide only an air inlet pipe 135 for allowing the dry air supplied through an air supply line 121 of the air supply system 120 to pass through the stack load 133 to be supplied to the inside of the fuel cell stack 200, and a valve means 136 for controlling the flow direction of the dry air.

It can be seen from FIG. 2 that the pipe 135 is provided such that the air supplied to the cathode of the fuel cell stack 200 by the air blower 122 passes through the stack load 133, i.e., the stack-coupled resistor, and the dry air heated by the stack-coupled resistor 133 is supplied to the cathode of the fuel cell stack 200.

The pipe 135 configured to pass through the stack load 133 forms a bypass line 135 provided in the air supply line 137, and the bypass line 135 allows the dry air supplied through the air supply line 137 to be bypassed to the stack load 133 and then supplied to the cathode of the fuel cell stack 200.

Therefore, the dry air supplied by the air supply system 120 may flow through either a passage which does not pass through the stack load 133 but is directly connected to the cathode of the fuel cell stack 200 or a passage which passes through the stack load 133 and is connected to the cathode of the fuel cell stack 200.

Moreover, the valve means 136 is provided to control the flow direction of the dry air such that the dry air is supplied through one of the two passages and, as the valve means 136, a three-way valve may be located in a position where the bypass line 135 is branched from the air supply line 137.

Since the bypass line 135 and the valve means 136 are provided such that the dry air selectively passes through the stack load 133, the dry air may not be directly supplied to the cathode of the fuel cell stack 200 but pass through the stack load 133, and thus it is possible to supply the dry air heated by the stack load 133 to the cathode of the fuel cell stack 200 during shutdown of the fuel cell system.

As such, in the air purging process for removal of water according to the present invention, it is possible to supply the heated dry air to the cathode of the fuel cell stack 200 using the existing stack load 133 configured to generate heat by the current from the fuel cell stack 200 during shutdown of the fuel cell system without adding any devices such as a heater.

Next, an efficient removal of water from the fuel cell stack and a shutdown process of the fuel cell system, which are performed in the above-described configuration, will be described with reference to FIGS. 3 to 5.

Figure 3:
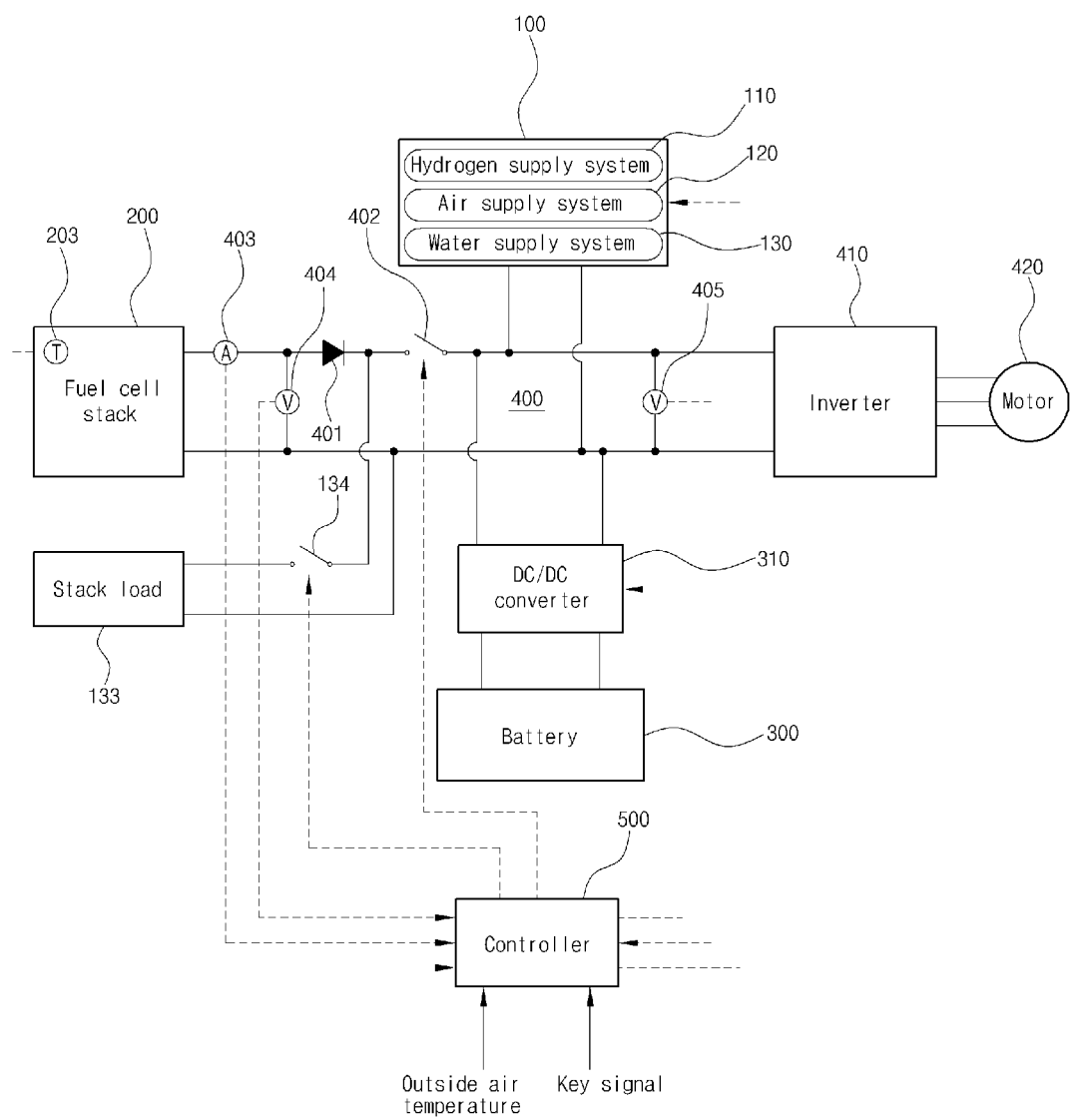
FIG. 3 is a power distribution diagram of a fuel cell system in accordance with a preferred embodiment of the present invention.

Referring to FIG. 3, the fuel cell stack 200 as a main power source and a battery (high-voltage battery) 300 as an auxiliary power source are connected to each other in parallel, and the battery 300 is connected to a main bus terminal 400 at the output side of the fuel cell stack 200 via a DC/DC converter 310. That is, the two power sources such as the fuel cell stack 200 and the battery 300 are connected in parallel to the respective loads in the fuel cell system through the main bus terminal 400.

An inverter 410 for rotating a drive motor 420 is connected to the output side of each of the fuel cell stack 200 and the battery 300 through the main bus terminal 400 to convert the power from either the fuel cell stack 200 or the battery 300 in response to a control signal output from a controller 500, thus driving the drive motor 420.

The DC/DC converter 310 DC/DC converts the power output from the fuel cell stack 200 to charge the battery 300 or DC/DC converts the power output from the battery 300 to supply the power to the respective loads in the fuel cell system. Moreover, during braking, the DC/DC converter 310

DC/DC converts regenerative energy generated from the drive motor 420 to charge the battery 300.

Balance of plant (BOP) components 100 as system loads required for the fuel cell system are connected to the main bus terminal 400 to be driven by either the power of the fuel cell stack 200 or the power of the battery (high-voltage battery) 300. The BOP components 100 include the hydrogen recirculation blower (as indicated by reference number 117 in FIG. 2) of the hydrogen supply system 110, the air blower (as indicated by reference number 122 in FIG. 2) of the air supply system 120, and a water supply system (i.e., water pump) 130 for circulating coolant.

Moreover, a reverse voltage protection diode 401 for preventing a surge voltage from being supplied to the fuel cell stack 200 is provided in the main bus terminal 400 at the output side of the fuel cell stack 200, and the stack load 133 is connected to the rear end of the reverse voltage protection diode 401. A main relay 401 for controlling the power of the fuel cell stack 200 in response to a control signal of the controller 500 is connected to the rear end of the stack load 133, and the rear end of the main relay 401 is connected to the BOP components 100, the DC/DC converter 310, the battery 300, the inverter 410, and the drive motor 420.

As mentioned above, the stack load 133, which is a passive load such as a resistor used to exhaust the oxygen and eliminate the voltage of the fuel cell stack 200 during shutdown of the fuel cell system, is connected to the output of the fuel cell stack 200 through the main bus terminal 402 and is operated by selectively receiving the power according to the operation of the relay 134 switched on and off by a control signal output from the controller 500.

The stack load 133 in the present invention is additionally used to heat the dry air supplied to the cathode of the fuel cell stack 200 by the air supply system 120 during the air purging process for removal of water in the fuel cell stack 200 and, at this time, the stack load 133 is operated by either the power of the fuel cell stack 200 or the power of the battery 300.

The controller 500 controls the overall operation of the fuel cell system. That is, the controller 500 analyzes information of a temperature sensor 203 for detecting the temperature inside the fuel cell stack 200, a current detector 403, and voltage detector 404 and 405 to perform feedback control such that the optimum power required for the operation of the system is output.

The shutdown process will be described in more detail. The shutdown process generally includes a step of removing water in the fuel cell stack 200 and a shutdown step of exhausting the oxygen in the cathode and eliminating the voltage of the fuel cell stack 200.

In the step of removing water in the fuel cell stack 200, the air supplied by the air supply system 120 is heated by the stack load 133 and then supplied to the cathode of the fuel cell stack 200 to purge the interior of the cathode.

The stack load 133 is operated by the power in a state where the relay 134 is switched on by a control signal of the controller 500 to heat the purge gas (air) during the water removal step and to consume the current of the fuel cell stack 200 for the purposes of exhausting the oxygen in the cathode and eliminating the voltage of the fuel cell stack 200 during the typical shutdown step.

In the configuration of FIG. 3, the air supplied during the water removal step may be the dry air supplied by the air blower 122 after the water source of the humidifier 123 is cut off by bypassing the exhaust gas from the fuel cell stack 200 through the bypass valve 202 so as not to pass through the humidifier 123.

The dry air is heated while passing through the stack load 133 along the passage selected by the valve means 136 and supplied to the cathode of the fuel cell stack 200 as a purge gas to discharge the water present in the cathode to the exhaust line 201 at the output side of the cathode.

Both the bypass valve 202 and the valve means 136 (e.g., three-way valve) are electronic control valves which are operated by a control signal of the controller 500, and the operations thereof are controlled such that the dry air passes through the stack load 133 by a control signal output from the controller 500 which has detected the shutdown of the fuel cell system.

The valve means 136 may be configured to control the amount of dry air passing through the stack load 133 under the control of the valve opening degree of the controller 500 and, in this case, the temperature of the dry air, i.e., heated gas, supplied to the fuel cell stack 200 may be controlled.

Meanwhile, the above-described water removal process may include a stack warm-up purging step in which the power of the fuel cell stack 200 is used as the operating power source of the stack load 133 and a stack no-load purging step in which the power of the battery 300 is used.

Figure 4A:
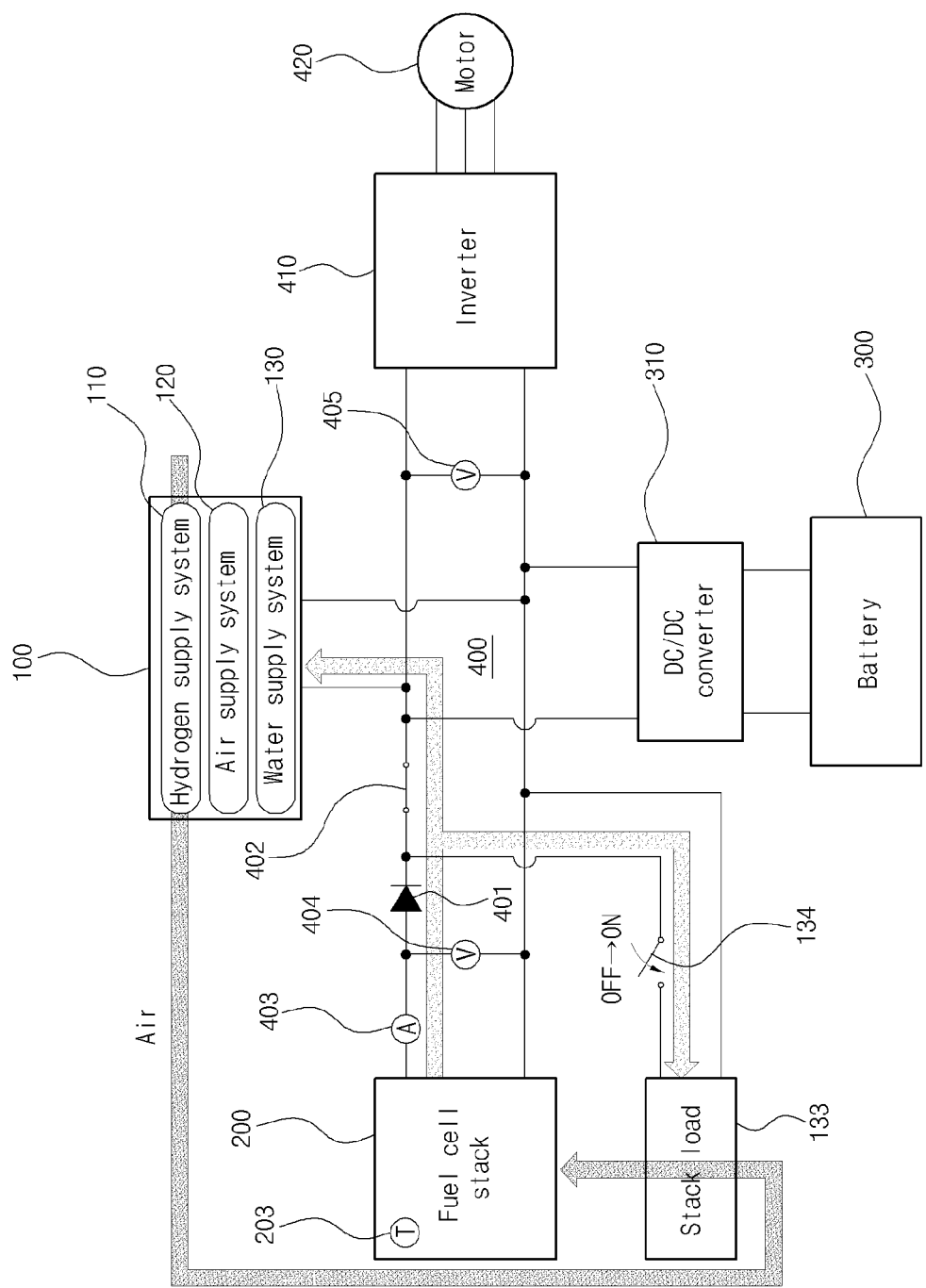
FIGS. 4A to 4C are operational diagrams showing an air supply state and a power supply state during shutdown of a fuel cell system in accordance with a preferred embodiment of the present invention.
Figure 5:
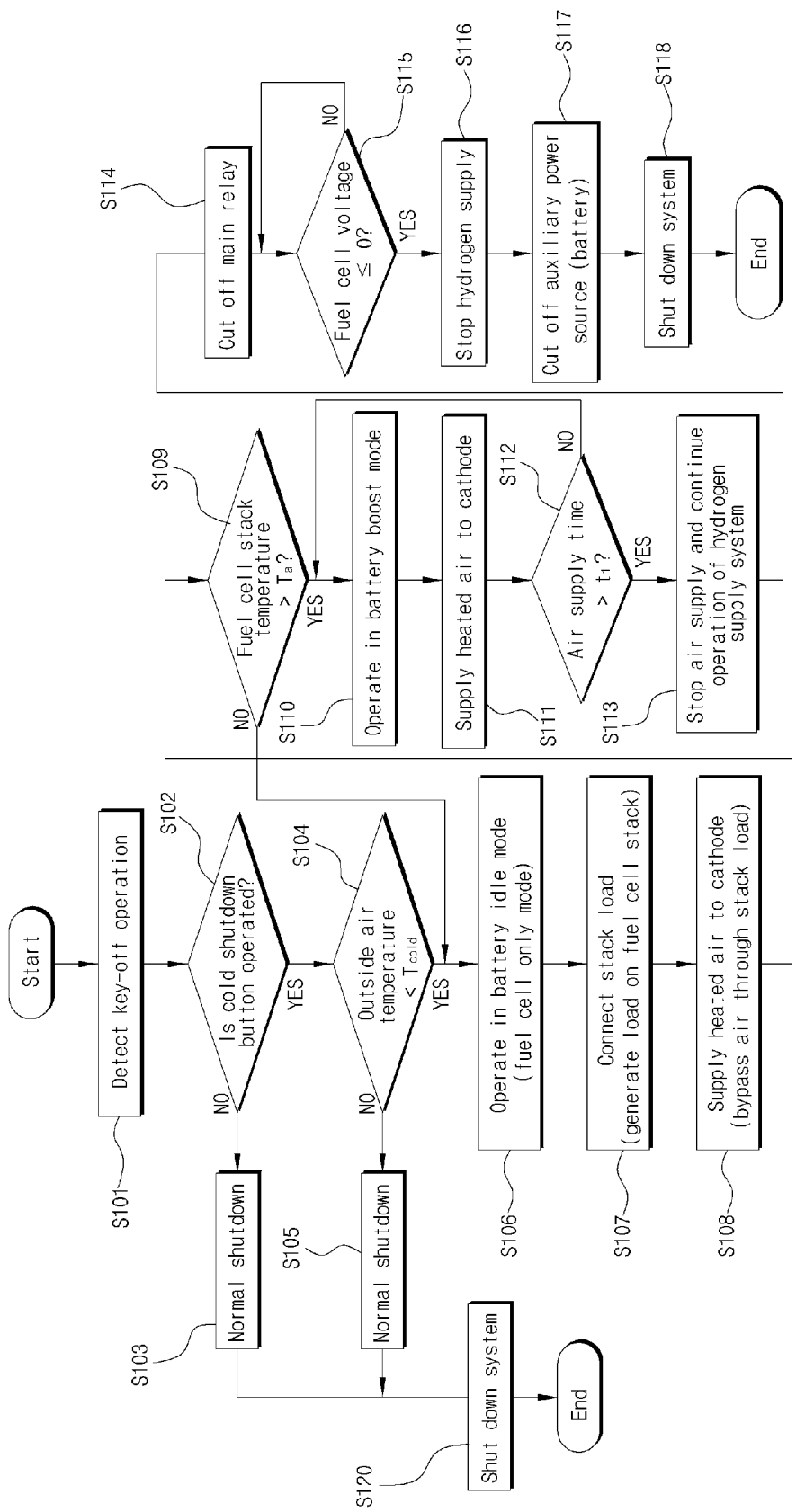
FIG. 5 is a flowchart illustrating a water removal process and a shutdown process of a fuel cell system in accordance with a preferred embodiment of the present invention.

FIG. 4A shows the stack warm-up purging step. In the stack warm-up purging step, only the power of the fuel cell stack 200 is used (fuel cell only mode/battery idle mode) to supply heated gas (i.e., heated air) to the cathode of the fuel cell stack 200. Therefore, the fuel cell stack 200 uses the hydrogen supplied by the hydrogen supply system 110 and the heated air supplied by the air supply system 120 as the reactant gases to generate electrical energy and, thus the stack load 133 generates heat by the current applied from the fuel cell stack 200. At this time, the air passing through the stack load 133 is heated by the stack load 133 and then supplied to the cathode of the fuel cell stack 200.

While the power of the fuel cell stack 200 is output, the BOP components 100 such as the air blower, the hydrogen recirculation blower, and the water pump required for the operation of the system are driven by the power of the fuel cell stack 200 and, since the air heated by the stack load 133 is supplied to the cathode to purge the interior of the cathode at the same time when the fuel cell stack 200 itself is warmed up, it is possible to facilitate the water removal.

Moreover, as the current is applied from the fuel cell stack 200, the water present in the membrane is transferred to the channel region and removed together with the product water produced by the fuel cell reaction by the heated gas purging.

While the air passes through the stack load 133, the stack load 133 is cooled in an air cooling manner.

Figure 4B:
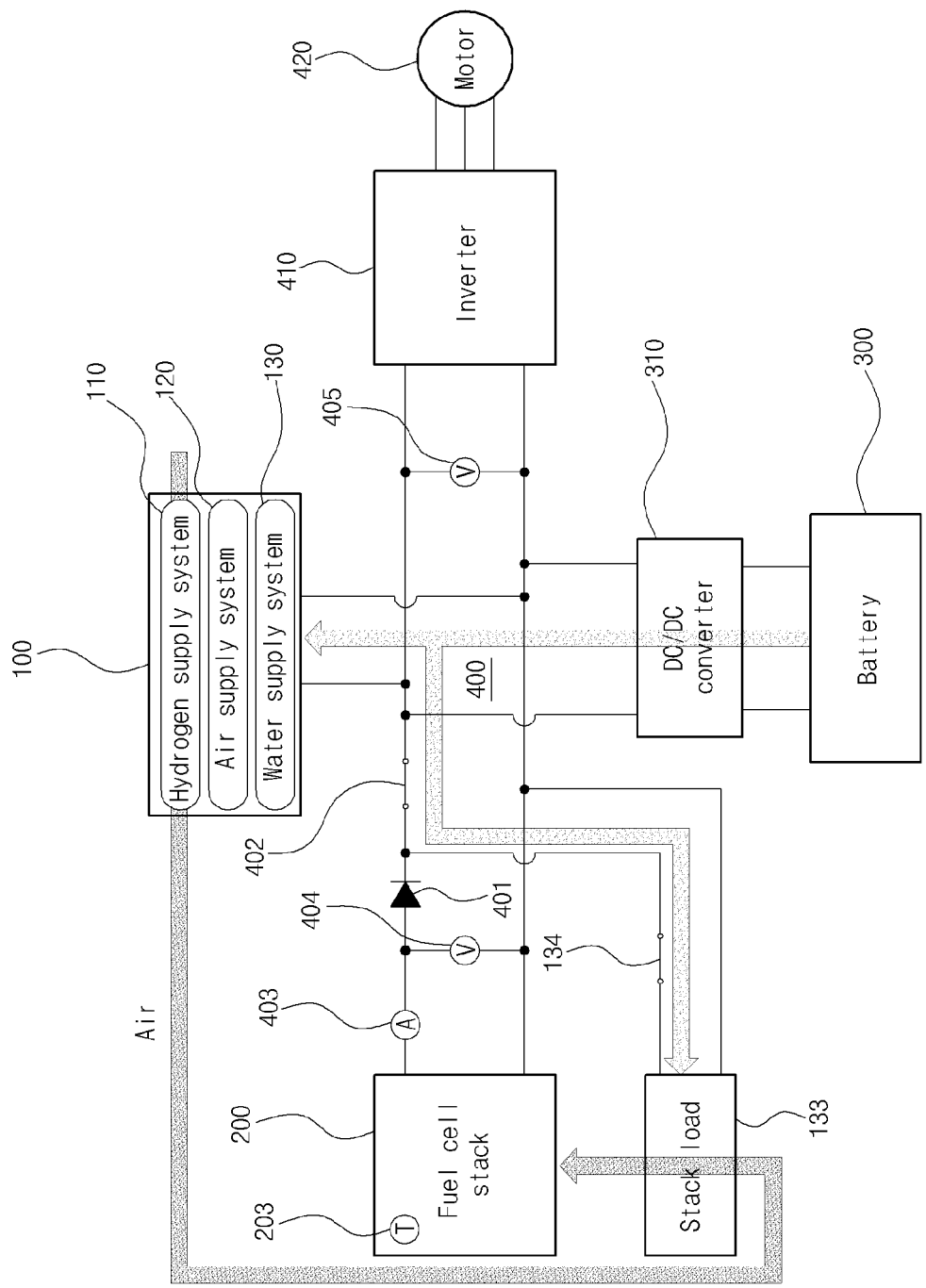

FIG. 4B shows the stack no-load purging step. The stack no-load purging step is to remove water after the temperature of the fuel cell stack 200 is increased to a certain value. During the stack no-load purging step, the stack load 133 is driven only by the power of the battery 300 as the auxiliary power source to heat the air supplied to the cathode of the fuel cell stack 200.

At this time, while the relay 134 of the stack load 133 is being turned on, the voltage of the battery 300 is boosted by the boost control of the DC/DC converter 310 to increase the voltage of the main bus terminal 400, and thus the stack load 133 is driven only by the power of the battery 300.

Simultaneously, the BOP components 100 such as the air blower and the hydrogen recirculation blower are also driven by the power of the battery 300. As such, in the stack no-load state, the air is heated by the stack load 133 driven only by the power of the battery 300 and supplied to the cathode of the fuel cell stack 200, and thus the water is additionally removed.

After the water removal step performed by supplying the purge air is completed, the shutdown step is performed to exhaust the oxygen in the cathode and eliminate the voltage of the fuel cell stack while the supply of air is cut off and the supply of hydrogen is maintained.

Figure 4C:
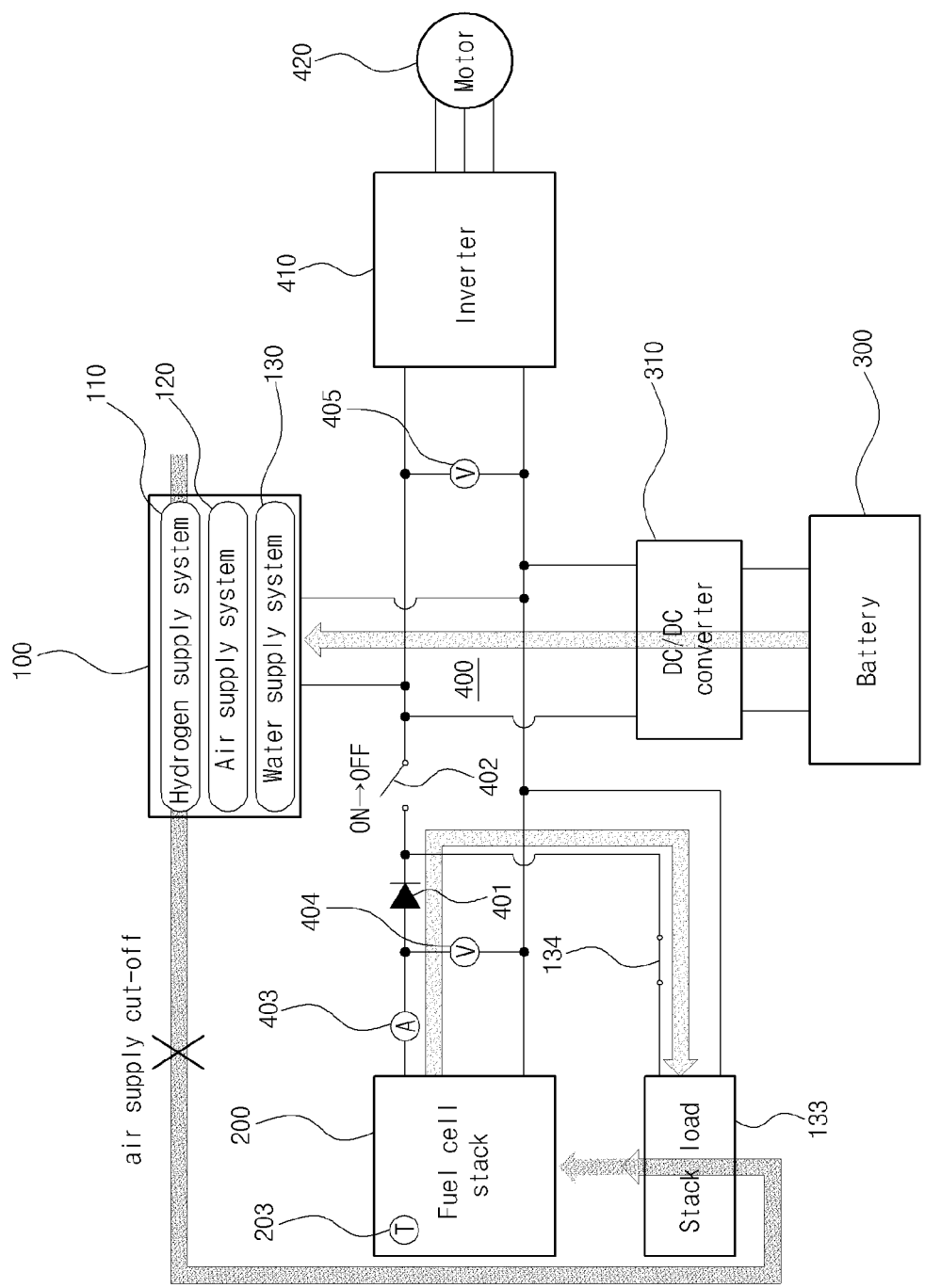

FIG. 4C shows the shutdown step performed after the removal of water. During the shutdown of the fuel cell system, the operation of the air blower of the air supply system 120 is stopped to cut off the supply of air and the hydrogen supply system 110 is still driven so as to continuously supply hydrogen. At this time, since the hydrogen is continuously supplied although the main relay 401 is turned off to cut off the power of the battery 300 to the stack load 133, the hydrogen recirculation blower of the hydrogen supply system 110 is continuously driven by the power of the battery 300.

Subsequently, when the voltage of the fuel cell stack 200 is eliminated, the operation of the hydrogen supply system 110 is cut off to stop the supply of hydrogen, and the power of the battery 300 is cut off by the DC/DC converter 310, thus completely shutting down the system.

The above-described shutdown process will be described below with reference to the flowchart of FIG. 5.

When detecting a key-off operation in a key-on state where the fuel cell system is normally operated to drive the loads (S101), the controller 500 determines whether a cold shutdown button is operated (S102).

If it is determined that the cold shutdown button is not operated, a normal shutdown process is carried out. More specifically, the main relay 401 is cut off while the supply of air is cut off (the operation of the air blower of the air supply system is cut off) and the supply of hydrogen to the anode is maintained, and the current of the fuel cell stack is consumed by the stack load 133 (while the relay 134 of the stack load 133 is being turned on) to exhaust the oxygen in the cathode and eliminate the voltage of the fuel cell stack, thus shutting down the system (S103, S120).

On the contrary, if it is determined that the cold shutdown button is operated, the controller 500 detects the outside air temperature through an outside air temperature sensor and determines whether it is below a first predetermined reference temperature ($T_{cold}$) (S104).

If the outside air temperature is not below the first reference temperature ($T_{cold}$), it is determined that the ambient temperature of the fuel cell system is maintained at room temperature (where the inside of the fuel cell stack is not frozen over), and the above-described normal shutdown process is performed to shut down the system (S105, S120).

However, if the outside air temperature is below the first reference temperature ($T_{cold}$), it is determined that the ambient temperature of the fuel cell system is maintained below the freezing point, and the stack warm-up purging step and the stack no-load purging step are sequentially performed to remove the water present in the fuel cell stack. Then, the main relay 401 is cut off, and the shutdown process of exhausting the oxygen in the cathode and eliminating the voltage of the fuel cell stack using the stack load 133 is performed to shut down the system.

That is, the vehicle enters the battery idle mode (fuel cell only mode) to perform the stack warm-up purging step at a temperature below the freezing point (S106) and, at this time, the controller 500 turns on the relay 134 to generate a load on the fuel cell stack 200, thus connecting the stack load 133 (S107).

Moreover, in the fuel cell only mode, while the supply of hydrogen to the anode of the fuel cell stack 200 is maintained (the operation of the hydrogen supply system including the hydrogen recirculation blower is maintained), the controller 500 continuously drives the air blower (as indicated by reference number 122 in FIG. 2) of the air supply system 120 and controls the valve means (as indicated by reference number 136 in FIG. 2) such that the air supplied by the air supply system 120 passes through the stack load 133.

At this time, since the air is heated by the stack load 133 and supplied to the cathode of the fuel cell stack 200 (S108) and uses as the reactant gases together with the normally supplied hydrogen, the output power of the fuel cell stack 200 is maintained by the electrochemical reaction of the reactant gases.

In the fuel cell only mode, the power of the battery 300 as the auxiliary power source is cut off by the control of the DC/DC converter 310 and, at this time, the stack load 133 is operated only by the power of the fuel cell stack 200, and the BOP components 100 required for the operation of the fuel cell system, such as the air blower 122 and the hydrogen recirculation blower (as indicated by reference number 117 in FIG. 2), are also driven only by the power of the fuel cell stack 200.

Moreover, while the reaction takes place in the fuel cell stack 200 and the power is output from the fuel cell stack 200, the temperature inside the fuel cell stack 200 is increased by its heat generation, the water present in the membrane is transferred to the channel region of the cathode by applying the current of the fuel cell stack 200, the heated air is supplied to the cathode of the fuel cell stack, and thus the water transferred to the channel region is removed together with the product water.

Subsequently, the controller 500 determines whether the temperature of the fuel cell stack 200 detected by the temperature sensor 203 exceeds a second predetermined reference temperature ($T_a$) (S109) and, if it is determined that the temperature of the fuel cell stack 200 exceeds the second reference temperature ($T_a$), performs a battery boost mode (as shown in FIG. 4B) for the stack no-load purging step (S110).

At this time, the controller 500 cuts off the power of the fuel cell stack 200 and, at the same time, allows the stack load 133 to be operated only by the power of the battery 300 through the boost control of the DC/DC converter 310. In this case, the relay 134 is kept turned on to operate the stack load 133.

In the battery boost mode, while the supply of hydrogen to the anode is continuously maintained, the air supplied by the air supply system 120 passes through the stack load 133 to be heated and is then supplied to the cathode of the fuel cell stack 200, thus purging the interior of the cathode of the fuel cell stack 200 to remove the water present therein (S111).

Since the BOP components 100 such as the air blower and the hydrogen recirculation blower are operated only by the power of the battery 300 in the battery boost mode, the fuel cell stack is in the no-load state.

During the stack no-load purging step in which the stack load 133 is heated only by the power of the battery 300, the controller 500 determines whether a predetermined time t1 has elapsed (S112) and, if it is determined that the predetermined time t1 has elapsed, stops the operation of the air supply system (120) (air blower) while the supply of hydrogen to the anode is continuously maintained (S113). Then, the controller 500 performs the normal shutdown process of the fuel cell system.

At this time, the main relay 401 is cut off (S114) while the supply of air is cut off and the supply of hydrogen to the anode is continuously maintained, and the current of the fuel cell stack 200 is consumed using the stack load 133 (while the relay 134 is being turned on), thus performing the normal shutdown process to exhaust the oxygen in the cathode and eliminate the voltage of the fuel cell stack.

In the above shutdown process, when the voltage of the fuel cell stack is eliminated (S115), the supply of hydrogen to the anode of the fuel cell stack 200 is cut off (S116) by closing the hydrogen supply valve and stopping the operation of the hydrogen recirculation blower, and the power of the battery 300 as the auxiliary power source is cut off (S117), thus completely shutting down the system (S118).

Figure 6:
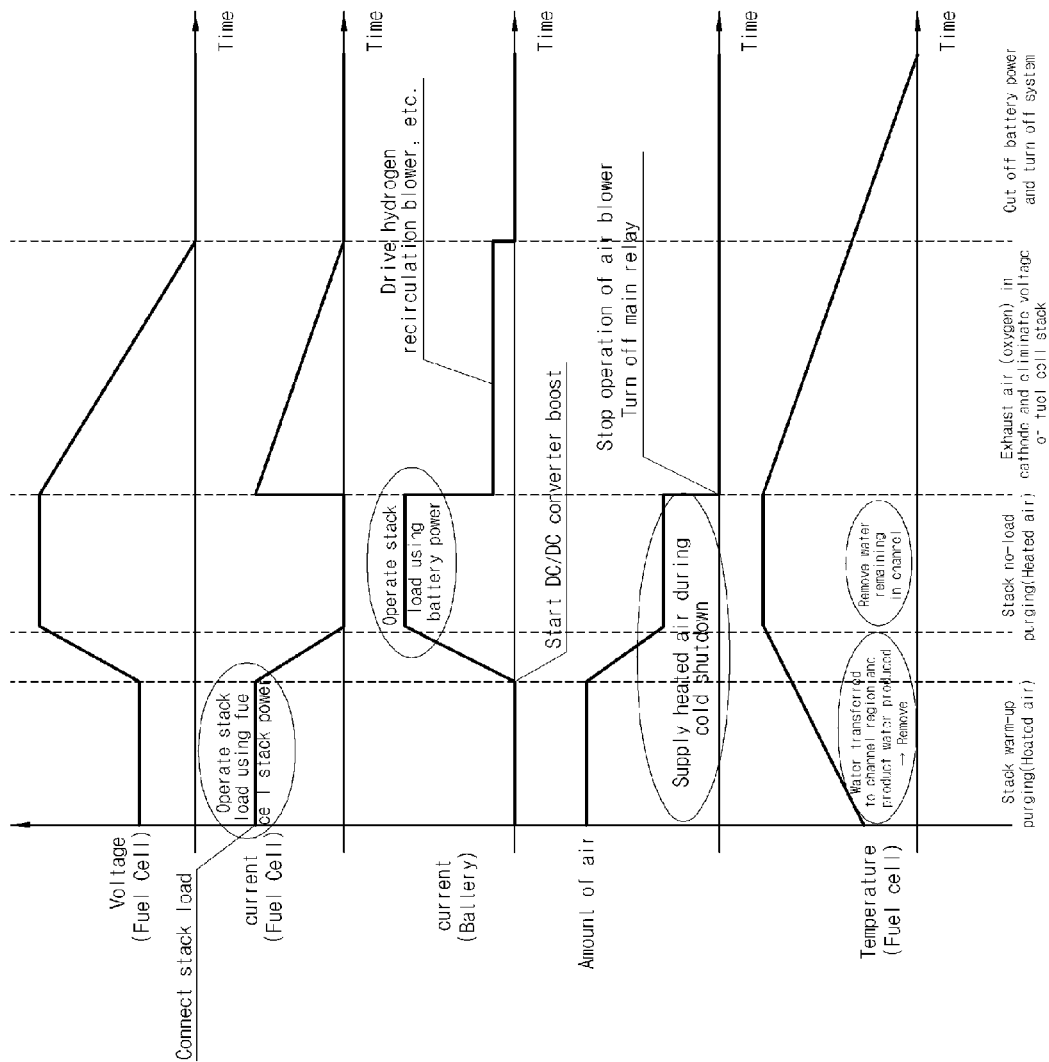
FIG. 6 is a graph showing the main factors that may affect a shut down process of a fuel cell system in accordance with a preferred embodiment of the present invention.

FIG. 6 is a graph showing the main factors that may affect the shutdown process of the fuel cell system in accordance with a preferred embodiment of the present invention, in which the voltage and power status of the fuel cell stack according to the elapse of time, the current status of the battery, the amount of air supplied to the cathode of the fuel cell stack, and the temperature of the fuel cell stack are shown.

As shown in FIG. 6, when the stack warm-up purging step is initiated during the cold shutdown after detecting the key-off operation, only the fuel cell stack outputs power while the stack load is connected to the fuel cell stack and the power of the battery is cut off (i.e., the battery current is cut off), and the temperature of the fuel cell stack is gradually increased during the stack warm-up purging step (fuel cell only mode/battery idle mode).

During the stack warm-up purging step, the water present in the membrane is transferred to the channel region of the cathode and then removed together with the product water produced in the cathode by the heated air.

Subsequently, when the stack no-load purging step is initiated, the power of the fuel cell stack is cut off and only the power of the battery is output. As a result, the water remaining in the channel region of the cathode is removed by the heated air during the stack no-load purging step (battery only mode).

When the water is completely removed, the normal shutdown step of eliminating the voltage of the fuel cell stack is performed. In this step, the supply of hydrogen to the cathode is maintained while the supply of air is cut off to exhaust the oxygen in the cathode and, at this time, the current output from the battery is used to drive the hydrogen recirculation blower to supply hydrogen.

When the oxygen in the cathode completely exhausted and the voltage is also completely eliminated from the fuel cell stack, the power of the battery is cut off, and the shutdown of the system is completed.

Although the current profile output from the fuel cell stack is set to a predetermined value at the beginning of the water removal step in the example shown in the figure, the current output from the fuel cell stack may be adjusted to various profiles by controlling the resistance value of the stack load.

Moreover, since the amount of product water is increased although the amount of water transferred to the channel region is increased by applying the current of the fuel cell stack, it is necessary to optimize the magnitude of current. For example, the magnitude of current may be set to a profile that gradually increases and then gradually decreases, and its implementation is possible by controlling the amount of battery power assist.

As described above, the methods for shutting down the fuel cell system in accordance with the present invention provide advantages including the following.

When the fuel cell system is shut down at a temperature below the freezing point (during cold shutdown), the BOP components and the stack load as a stack-coupled resistor are operated only by the power of the fuel cell stack to heat the air and purge the interior of the cathode of the fuel cell stack using the heated air such that the water in the membrane is transferred to the channel region and then removed together with the product water while the power of the fuel cell stack is output.

Moreover, while the power of the fuel cell stack is used, the fuel cell stack is warmed up and, when the temperature of the fuel cell stack reaches a predetermined level, the stack load is operated by the power of the electricity storage means (e.g., battery) as an auxiliary power source and the heated air is supplied to purge the interior of the cathode of the fuel cell stack, thus more efficiently remove water before the system is completely shut down.

Especially, since the stack load provided in the fuel cell system to consume the current of the fuel cell stack during the shutdown of the fuel cell system is used as a heating means for supplying heated air, a separate heating means is not required.

As a result, the water remaining in the fuel cell stack is completely removed by supplying the heated air during the shutdown of the fuel cell system, and thus it is possible to improve the cold startability of the fuel cell system.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for shutting down a fuel cell system, the method comprising:
    determining, by a controller, whether an outside air temperature is below a first predetermined reference temperature when a shutdown of a fuel cell system is detected;
    warming up a fuel cell stack by operating a balance of plant components of the fuel cell system and a stack-coupled resistor using power from the fuel cell stack, when the outside air temperature is below the first reference temperature, wherein a valve between a blower and the fuel cell stack is controlled to bypass air received at the valve through the stack-coupled resistor before being received by the fuel cell stack;
    removing water in the fuel cell stack by passing air supplied by an air supply system just through the stack-coupled resistor to supply heated air to a cathode of the fuel cell stack; and
    shutting down, by the controller, the fuel cell system by cutting off the supply of air after the removal of water,
    wherein: when the controller determines that the outside air temperature is below the first reference temperature, the warm-up of the fuel cell stack and the removal of the water from the fuel cell stack are performed in a fuel cell only mode in which the balance of plant components and the stack-coupled resistor is operated only by the power from the fuel cell stack, and
    then when the controller determines that the temperature of the fuel cell stack exceeds a second predetermined reference temperature while the heated air is being supplied to the cathode,
        the balance of plant components and the stack-coupled resistor are switched to be only operated by the power of a battery as an auxiliary power source instead of the fuel cell stack for a predetermined period of time in order to supply the air supplied by the air supply system and heated by the stack-coupled resistor to the cathode of the fuel cell stack, thus removing water from the fuel cell stack, and the fuel cell system is shut down by cutting off the supply of air thereto,
    wherein the second predetermined reference temperature is greater than the first predetermined reference temperature, wherein the stack-coupled resistor exhausts oxygen in the fuel cell stack and eliminates excess voltage from the fuel cell stack during the shutdown of the fuel cell system.

2. The method of claim 1, wherein the first reference temperature with respect to the outside air temperature is the freezing point of water.

3. The method of claim 1, wherein if it is determined that the outside air temperature is not below the first reference temperature, the supply of air to the fuel cell system is normally cut off to shut down the fuel cell system.

4. The method of claim 1, wherein the supply of hydrogen to the fuel cell stack is normally performed from the detection of the shutdown of the fuel cell stack until the fuel cell system is completely shut down.

* * * * *